United States Patent [19]

Barbour

[11] Patent Number: 5,758,569
[45] Date of Patent: Jun. 2, 1998

[54] POULTRY FRYING APPARATUS

[75] Inventor: Rodney Barbour, Brandon, Miss.

[73] Assignee: Barbour International, Jackson, Mich.

[21] Appl. No.: 625,505

[22] Filed: Mar. 28, 1996

[51] Int. Cl.⁶ .................................... A47J 37/12
[52] U.S. Cl. .................. 99/415; 99/418; 99/421 V
[58] Field of Search ................ 99/418, 415, 403, 99/450, 421 V, 419

[56] References Cited

U.S. PATENT DOCUMENTS

| | | |
|---|---|---|
| 1,189,498 | 7/1916 | Sesler . |
| 1,272,222 | 7/1918 | Clayton ........................ 99/418 |
| 1,909,983 | 5/1933 | Powell ........................ 99/415 X |
| 2,350,623 | 6/1944 | Kruea ........................ 99/419 |
| 3,225,681 | 12/1965 | Wells . |
| 3,713,378 | 1/1973 | West et al. ........................ 99/419 X |
| 3,789,822 | 2/1974 | Schantz . |
| 3,853,044 | 12/1974 | Albright et al. . |
| 4,250,803 | 2/1981 | Wohlfart . |
| 4,616,625 | 10/1986 | Froome . |
| 4,957,039 | 9/1990 | Reyes . |
| 5,106,642 | 4/1992 | Ciofalo ........................ 99/421 V X |
| 5,301,604 | 4/1994 | Takahashi . |
| 5,320,028 | 6/1994 | Grunberg ........................ 99/418 X |

FOREIGN PATENT DOCUMENTS

| | | | |
|---|---|---|---|
| 333782 | 6/1936 | Italy ........................ | 99/418 |
| 178687 | 7/1935 | Switzerland ........................ | 99/418 |
| 57 | of 1914 | United Kingdom ........................ | 99/415 |

Primary Examiner—Reginald L. Alexander
Attorney, Agent, or Firm—Rader, Fishman & Grauer PLLC

[57] ABSTRACT

A frying apparatus is disclosed which is specifically designed for deep-frying turkeys or other similarly shaped food items. The frying apparatus has a central rod attached to a perforated plate that is used to support a turkey as it is lowered and removed into a large container of hot oil. The frying apparatus also includes a grab hook that releasably couples to the central rod and allows a user to avoid burns from hot oil exposure when removing or inserting the turkey.

2 Claims, 2 Drawing Sheets

POULTRY FRYING APPARATUS

BACKGROUND OF THE INVENTION

The present invention pertains to a novel frying apparatus specifically designed for deep-frying of turkeys, other poultry, or similar sized food items.

Deep-frying of large food items, such as whole turkeys, presents many problems related to the large amount of oil needed to submerge the item, as well as the danger associated with heating large amounts of oil to a high temperature and immersing a large object into the hot oil. Previous attempts to fry turkeys have included using commercial stockpots to heat the oil. Standard size commercial stockpots tend to have a relatively wide diameter in proportion to their height, especially when compared to an upright turkey. A large amount of oil must be heated in the stockpot in order to submerge a turkey (which is preferably fried in an upright position) for frying. The use of standard size stockpots is therefore expensive and wasteful. A stockpot with higher sides and a smaller diameter is available, for example, from Morrone. Although the need for a pot in which to fry turkeys and the like has been met by tall and narrow pots, the prior art has not provided a way to insert and remove a large object, such as a turkey, into the pot.

There have also been attempts to design an apparatus to insert and remove a turkey from a pot of hot oil. Conventional frying baskets generally have one or two handles located near the top edge of a mesh or perforated basket which is placed in the hot oil. These conventional baskets are not appropriate for use in frying turkeys, because they are often not strong enough to support a large turkey (up to 16 pounds), and the handles are close to the hot oil, which is dangerous when there is splattering as the turkey is inserted or removed. In addition, frying a turkey requires immersion of the basket in hot oil for an extended amount of time (45–55 minutes for a 15 pound turkey), which will cause the handles to get hot, creating further danger when removing the turkey from the hot oil. Furthermore, frying baskets tend to be quite expensive to manufacture.

Other attempts to insert and remove a turkey have included dropping the turkey into the oil with human hands, which is very dangerous. Also, metal coat hangers have been used to insert and remove the turkey, which also expose the user to the danger of splashing hot oil. These prior attempts also present the danger of oil spilling from the stockpot onto the open flame of the gas cooker, which can cause a fire to break out.

The present invention overcomes these problems with a novel poultry frying apparatus that is described herein.

SUMMARY OF THE INVENTION

The object of the present invention is to provide a frying apparatus that allows a whole turkey or similarly sized food item to be deep-fried in oil while minimizing the danger presented by exposure to hot oil.

It is a further object of the present invention to provide a frying apparatus that can be utilized to fry a whole turkey evenly and avoid burning.

It is a further object of the present invention to minimize the amount of oil used to fry a whole turkey.

The above-mentioned objects are achieved by the provision of a frying apparatus that has a raised rack that fits inside a large vessel for holding cooking oil. The raised rack has plate with a central rod that is attached to the plate at its lower end. The plate has perforations to allow oil to flow through the plate. The central rod of the raised rack is releasably coupled to a grab hook to raise and lower the rack into and out of the vessel. One coupling mechanism that can be used is to provide a loop at the upper end of the central rod, and a hook at one end of the grab hook that can be inserted through the loop. The grab hook also has a handle for grasping. The plate of the raised rack has a plurality of feet on the bottom surface that rests on the interior of the vessel.

The vessel or stockpot that contains the oil is designed so that the sides have a height greater than the diameter of the vessel. Preferably the height is approximately sixteen inches and the diameter is eleven inches.

The method of frying a turkey or other poultry with the frying apparatus involves the steps of pouring cooking oil into a large pot sufficient to submerge a turkey, placing the pot on a gas cooker and heating the oil to a desired temperature. The turkey is then placed on a raised rack. The rack has a perforated plate with a central rod which is inserted through the body cavity of the turkey. Next, a grab hook is coupled to the central rod, and the grab hook and rack with the turkey is lowered into the oil. The grab hook is then removed from the rack, allowing the turkey to cook in the oil. When the turkey is done frying, the grab hook is coupled to the rack and the turkey is lifted from said oil.

DETAILED DESCRIPTION

Figure 1:
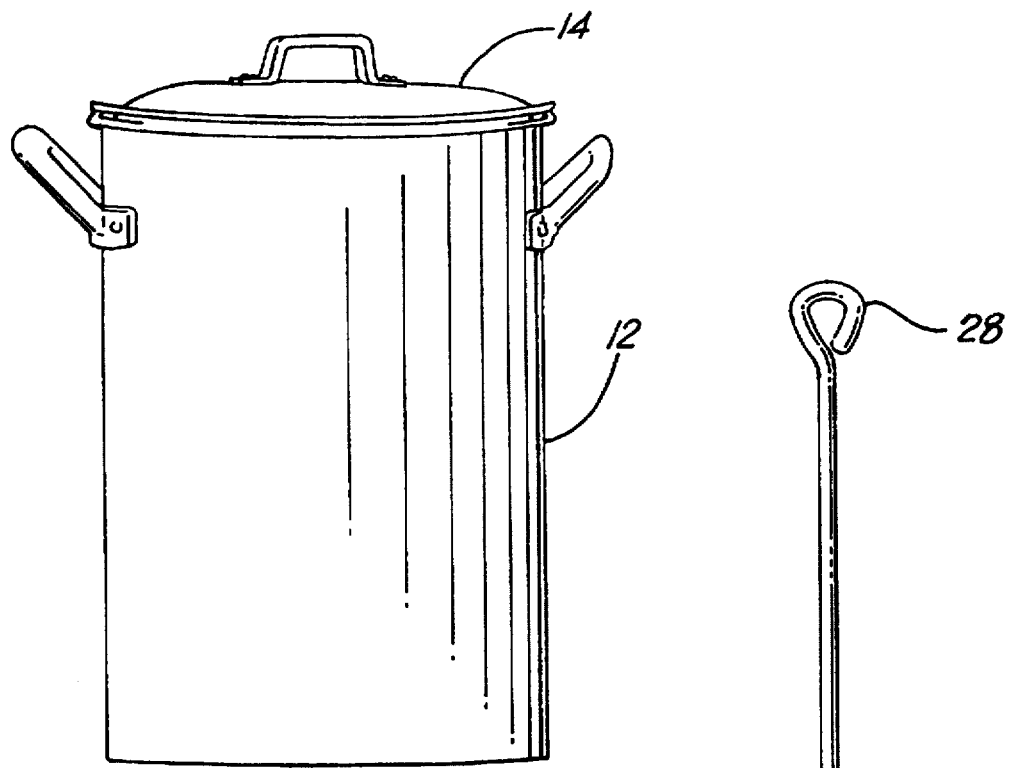
FIG. 1 is a perspective view of the stockpot and lid.
Figure 2:
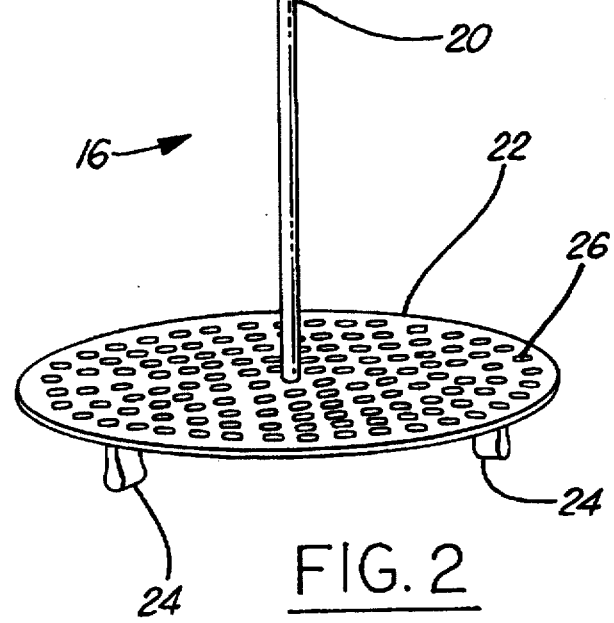
FIG. 2 is a perspective view of the raised rack.
Figure 3:
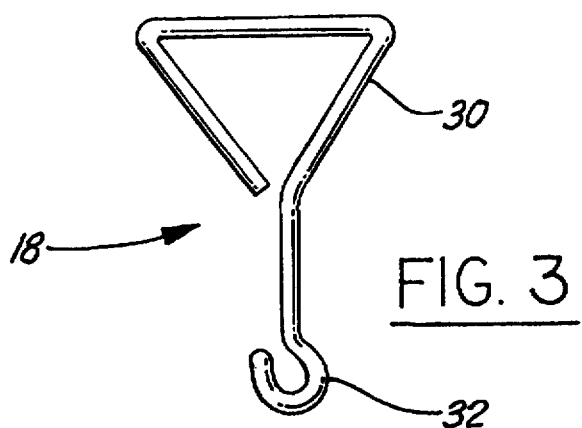
FIG. 3 is a perspective view of the grab hook.

As shown in FIGS. 1–3, the preferred embodiment of the frying apparatus 10 has a vessel or stockpot 12 with a lid 14. The stockpot 12 is generally provided with handles to lift and move the pot easily. A raised rack 16 is designed to fit inside the stockpot 12, and a grab hook 18 is designed to couple with the raised rack. The stockpot 12 is preferably designed with a relatively small diameter and tall sides compared to standard size stockpots. In the preferred embodiment, the stockpot 12 has a diameter of approximately 11 inches and the height of the sides is approximately 16 inches. If the apparatus is to be used to fry a smaller item, such as a chicken, the height and diameter could both be diminished in roughly the same proportion and the same benefits would be achieved. The lid 14 may be provided to allow the stockpot 12 to be used for steaming, soups or stews, but is not used for frying. The stockpot 12 and lid 14 are preferably constructed of commercial strength aluminum (at least 2.5 mm thick), strong enough to withstand cooking on an outdoor gas cooker.

Raised rack 16 has a central rod 20, which is attached at the center of round plate 22, which further has feet 24. Central rod 20 is attached to round plate 22 at its lower end, and has a loop 28 at the upper end. The central rod 20 must be securely attached to the plate 22 to ensure that the raised rack 18 will be sufficiently strong to raise a large turkey from the hot oil. The preferred method of manufacture is to insert the central rod 20 (preferably made of aluminum) through a central hole in plate 22, flatten the end of the rod and drill two holes through it, and then bend the end 90 degrees and rivet it onto the bottom surface of plate 22 through the two drill holes. Other methods of attachment such as welding are also possible.

Plate 22 supports the turkey, and through the use of feet 24, allows oil to circulate below the plate 22 and around the turkey. This design will prevent the turkey from being burned by contact with the stockpot 12. The feet 24 are preferably manufactured from aluminum flat rod riveted to the bottom of plate 22 to raise the plate 22 approximately 1 inch above the bottom of the pot. Plate 22 is preferably round, as shown in FIG. 2, with a diameter smaller than the diameter of the stockpot 12.

The plate 22 is provided with a plurality of perforations 26 to allow oil to pass through the plate 22. The number and size of the perforations should be designed to allow oil to pass freely, but also to allow a plate manufactured of aluminum to be strong enough to support a turkey of up to 16 pounds. In the preferred embodiment, the perforations have a diameter of 6 millimeters. The plate 22 is preferably designed with a diameter of 8 inches, which is large enough to accommodate and support a large turkey, but small enough to allow the oil to circulate around the turkey freely.

Grab hook 18 is provided to lift the rack 16 and turkey out of the oil. Grab hook 18 has a handle portion 30 and a hook portion 32, shaped from round aluminum rod. The handle portion 30 is preferably in the general shape of a triangle, as shown in FIG. 3. Alternatively, the handle portion 30 could be round, S-shaped, or any shape that would allow firm grasping by a human hand. The hook portion 32 is preferably bent at a 135 degree angle, and is placed inside a loop 28 provided at the upper end of central rod 20. Many alternative methods of coupling between the grab hook 18 and central rod 20 can be used. For example, the central rod 20 could be provided with a hook, and the grab hook 18 could be provided with a loop. Many further examples of releasable coupling are possible and are within the scope of the present invention. The entire grab hook is preferably approximate 8 inches in length, to allow a user's hands to be far from the hot oil when the turkey is inserted and removed.

Figure 4:
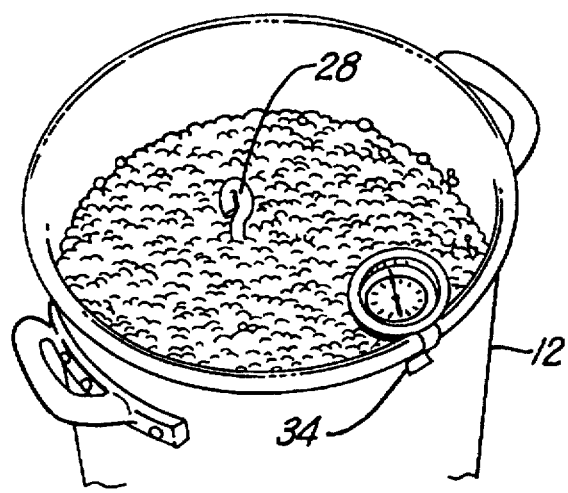
FIG. 4 is a perspective view of a turkey being fried in the apparatus.

The frying apparatus 10 is designed for use with outdoor gas cookers. In the preferred method of use, an outdoor gas cooker is lit and set at a low flame. The stockpot 12 is then filled with oil, preferably peanut oil to an appropriate level to allow the turkey to be fried to be immersed in the oil. As discussed above, the stockpot 12 is designed with a relatively narrow diameter to minimize the amount of oil needed. A long-stemmed deep-fry thermometer 34 is preferable attached to the top edge of the stockpot 12, to allow monitoring of the oil temperature as shown in FIG. 4. The stockpot 12 is then placed on the gas cooker, and the flame raised to heat the oil to a temperature of approximately 325° F.

The turkey is prepared for cooking by thawing (if frozen), cleaning, drying, and removing the giblets and neck. The turkey may also be rubbed with seasonings and injected with marinade if desired. The turkey is then placed on the rack, with the legs facing up. The central rod 20 is placed through the center of the turkey body, with the breast portion of the turkey resting on the plate 22. Inserting the turkey will cause the oil temperature to drop, so the heat must be increased to bring the oil temperature back up to 325°–350° F. The temperature should be monitored using the thermometer at all times. The turkey should be fried for 3 to 3½ minutes per pound or until golden brown.

Figure 5:
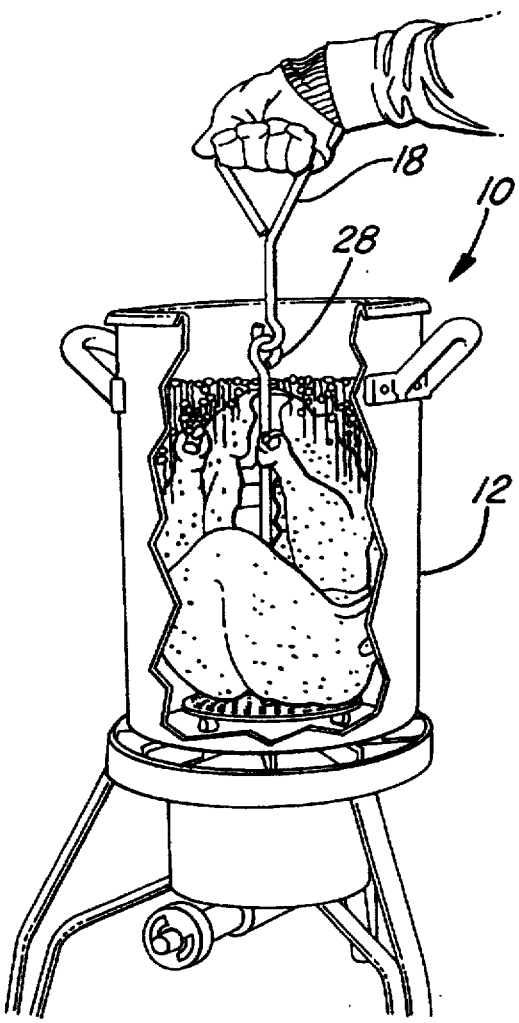
FIG. 5 is a cross-sectional view of a turkey being removed from the apparatus.
Figure 6:
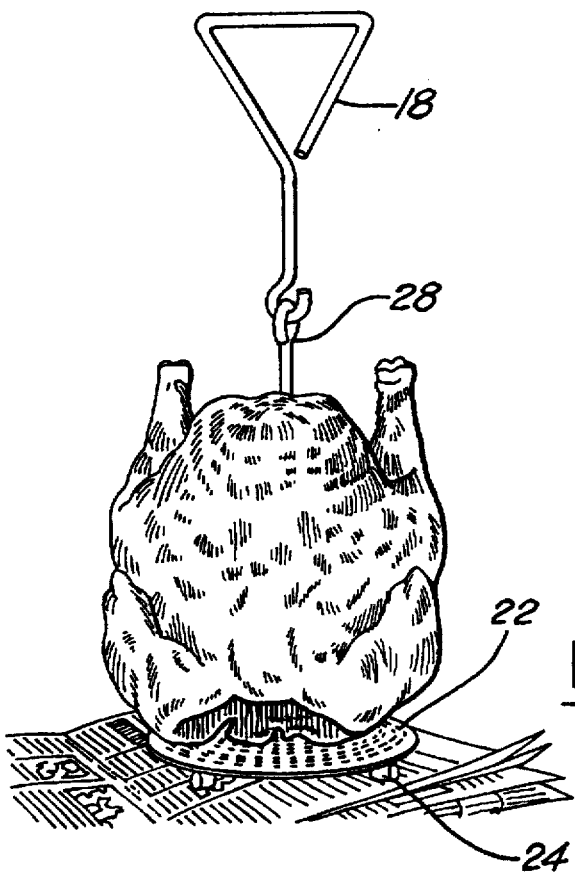
FIG. 6 is a perspective view of a turkey after being removed from the oil.

When the turkey is done, the gas cooker should be turned off. Then the grab hook 18 is placed through the loop 28 in the central rod 20 of the raised rack, and the turkey can be lifted out of the oil, as shown in FIG. 5. The turkey and rack are then placed on absorbent paper and allowed to drain for a few minutes before serving, as shown in FIG. 6.

Alternate uses of the present invention include frying of other poultry or meat products, or as a steamer with lid 14. The raised rack 16 allows food items to be positioned over a small amount of water to be cooked by steam. The size of the stockpot 12 also allows large amounts of food, such as crabs, ears of corn, or tamales to be steamed at one time.

I claim:

1. A frying apparatus comprising:
   a vessel with a first diameter;
   a raised rack, said rack comprising a central rod with a lower end and upper end,
   wherein said lower end is attached to a central area of a plate having a second diameter,
   wherein said second diameter is smaller than said first diameter,
   wherein said plate is further provided with a plurality of perforations,
   wherein said upper end of said central rod includes a loop portion for engaging a grab hook,
   wherein said plate has an upper surface and bottom surface,
   wherein said rack further comprises a plurality of feet attached to the bottom surface of said plate, and
   wherein said vessel has sides with a height wherein said height is substantially greater than said first diameter.

2. The frying apparatus of claim 1, wherein the height is sixteen inches and the first diameter is eleven inches.

* * * * *